United States Patent
Vehmeijer et al.

(10) Patent No.: US 10,184,588 B2
(45) Date of Patent: Jan. 22, 2019

(54) TENSIONER PAD ASSEMBLY

(71) Applicant: ITREC B.V., Schiedam (NL)

(72) Inventors: Terence Willem August Vehmeijer, Schiedam (NL); Jeroen Adrianus Joseph Donkers, Schiedam (NL); Joop Roodenburg, Schiedam (NL); Jilles Mattheus De Klerk, Schiedam (NL)

(73) Assignee: ITREC B.V., Schiedam (NL)

( * ) Notice: Subject to any disclaimer, the term of this patent is extended or adjusted under 35 U.S.C. 154(b) by 0 days.

(21) Appl. No.: 15/575,290

(22) PCT Filed: May 18, 2016

(86) PCT No.: PCT/NL2016/050355
§ 371 (c)(1),
(2) Date: Nov. 17, 2017

(87) PCT Pub. No.: WO2016/186499
PCT Pub. Date: Nov. 24, 2016

(65) Prior Publication Data
US 2018/0156360 A1  Jun. 7, 2018

(30) Foreign Application Priority Data

May 18, 2015  (NL) .................................. 2014813

(51) Int. Cl.
*F16L 1/23* (2006.01)
*B65H 51/14* (2006.01)

(52) U.S. Cl.
CPC ................ *F16L 1/23* (2013.01); *B65H 51/14* (2013.01)

(58) Field of Classification Search
CPC ............. B65H 51/14; E21B 19/22; F16L 1/23
See application file for complete search history.

(56) References Cited

U.S. PATENT DOCUMENTS

| 3,669,329 A | 6/1972 | Blanchet et al. |
| 2004/0055421 A1* | 3/2004 | Bangert ................. E21B 19/07 81/57.15 |

(Continued)

FOREIGN PATENT DOCUMENTS

| CN | 201755803 U | 3/2011 |
| EP | 0 125 612 A2 | 11/1984 |

(Continued)

OTHER PUBLICATIONS

International Search Report, issued in PCT/NL2016/050355, dated Sep. 27, 2016.

(Continued)

*Primary Examiner* — Michael C McCullough
(74) *Attorney, Agent, or Firm* — Birch, Stewart, Kolasch & Birch, LLP

(57) ABSTRACT

A tensioner pad assembly is adapted to be mounted on an endless track of a tensioner to frictionally clamp an elongated product supported and moved by the tensioner. The pad assembly includes a carrier member and a pair of gripping members, which gripping members can with their carrier member mating surfaces be mounted in multiple discrete gripping positions on gripping member mating surfaces of the carrier member. The mating surfaces form interlocking structures adapted to transfer a squeeze force from the carrier member to the gripping members. The interlocking structures provided on the carrier member define the multiple discrete gripping positions. The gripping member mating surfaces extend at an angle relative to each other, such that the multiple discrete gripping positions differ in their distance to the base portion as well as in their distance to the imaginary plane of the carrier member.

18 Claims, 8 Drawing Sheets

(56) References Cited

U.S. PATENT DOCUMENTS

| | | | | |
|---|---|---|---|---|
| 2007/0264084 A1* | 11/2007 | Signaroldi | ............. | E21B 19/07 |
| | | | | 405/158 |
| 2015/0167405 A1* | 6/2015 | Hickey | .................. | E21B 19/08 |
| | | | | 166/379 |
| 2016/0069478 A1* | 3/2016 | Mackinnon | ............... | F16L 1/23 |
| | | | | 405/168.4 |

FOREIGN PATENT DOCUMENTS

| | | |
|---|---|---|
| EP | 2 620 682 A2 | 7/2013 |
| GB | 2513342 A | 10/2014 |
| WO | WO 2008/007945 A1 | 1/2008 |
| WO | WO 2009/088287 A2 | 7/2009 |
| WO | WO 2014/007613 A1 | 7/2014 |

OTHER PUBLICATIONS

Written Opinion of the International Searching Authority, issued in PCT/NL2016/050355, dated Sep. 27, 2016.

\* cited by examiner

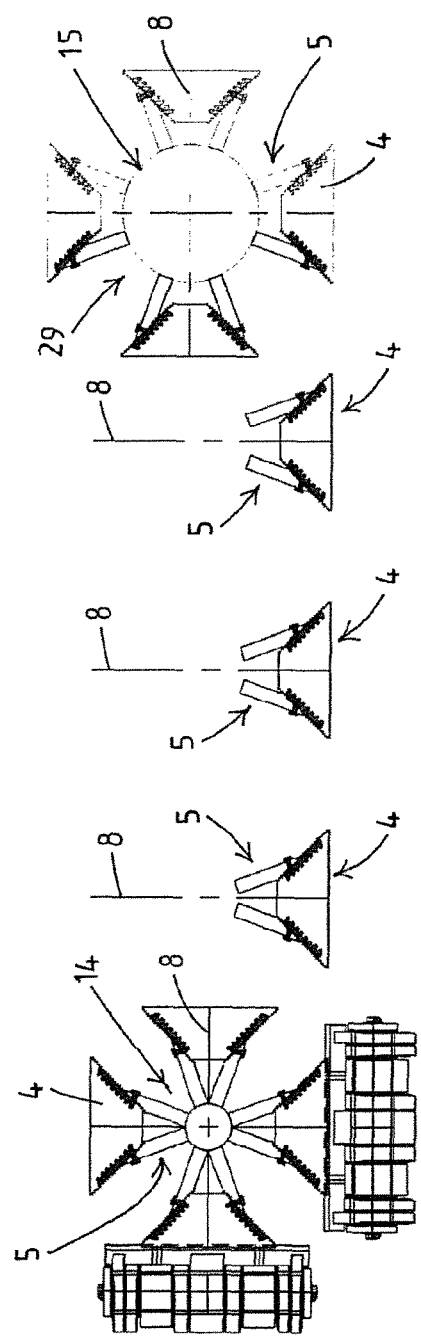
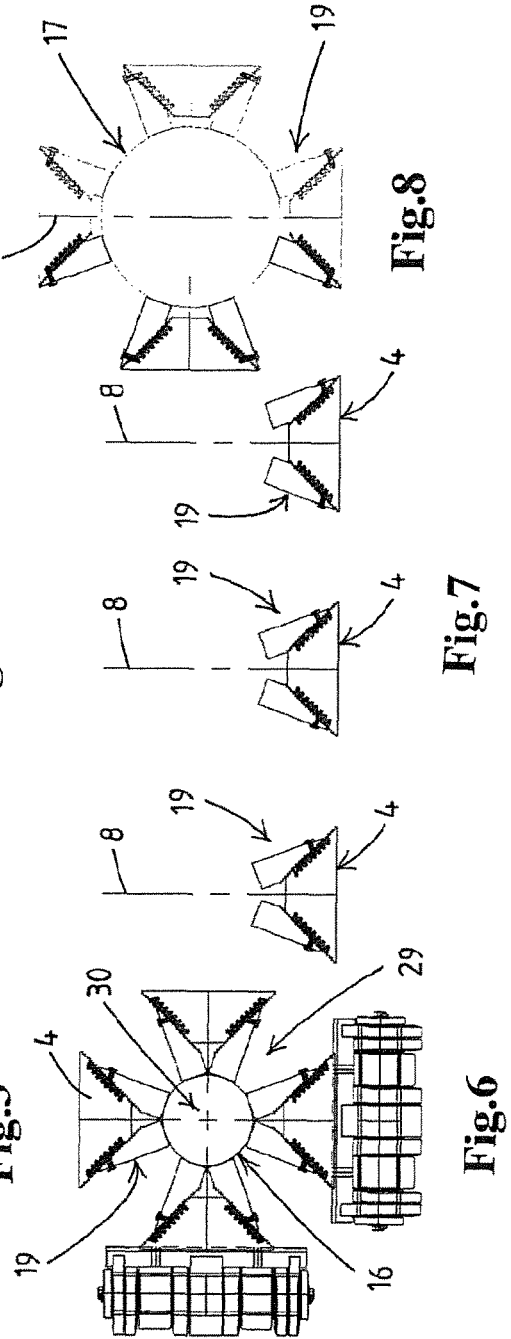

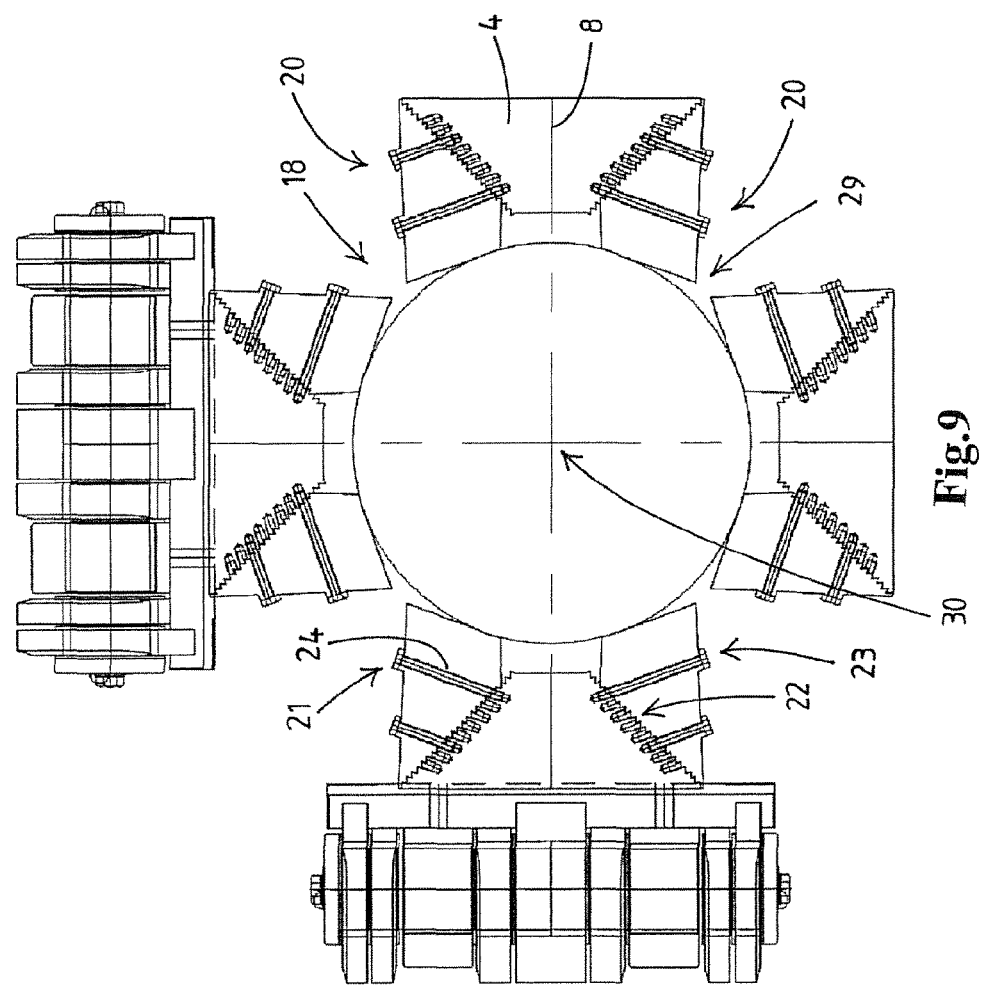

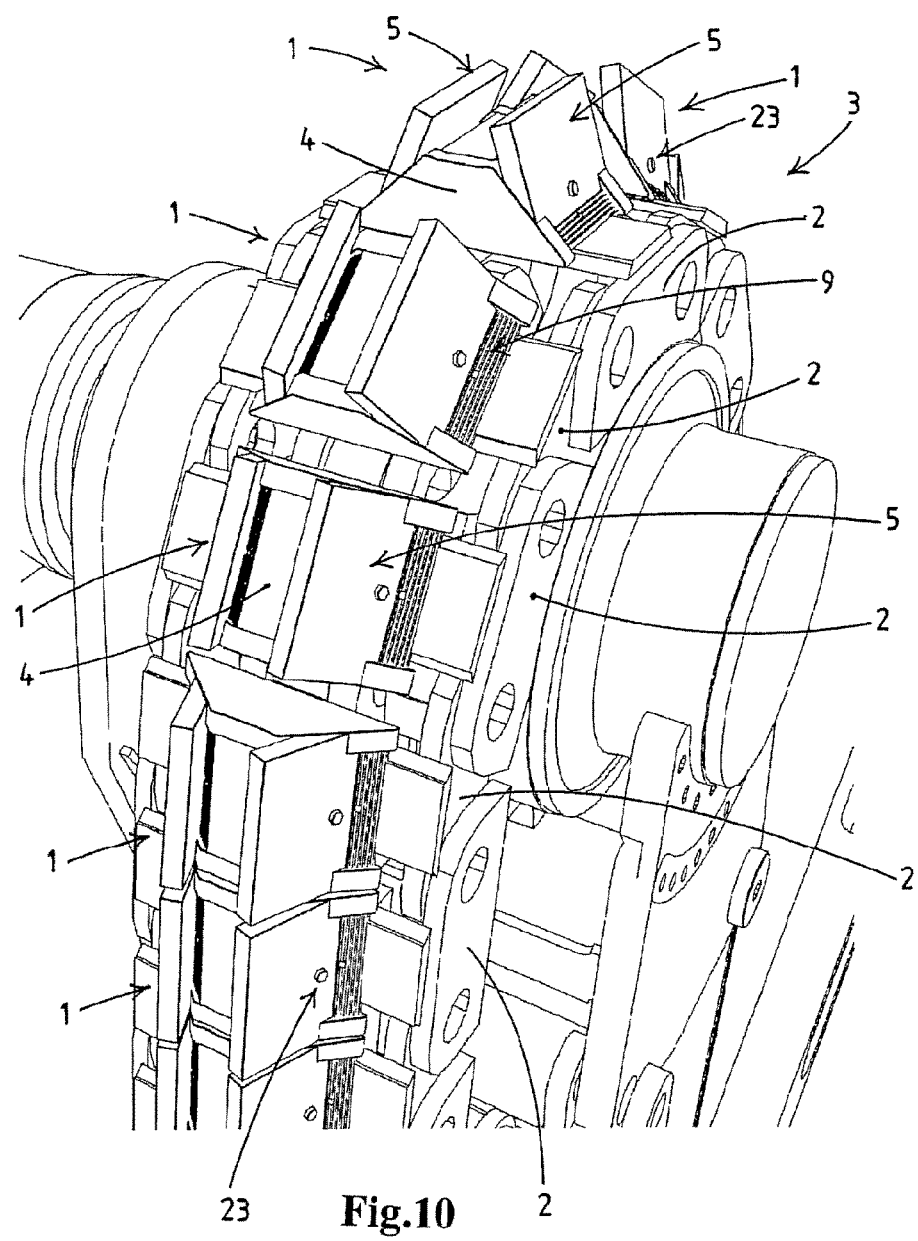

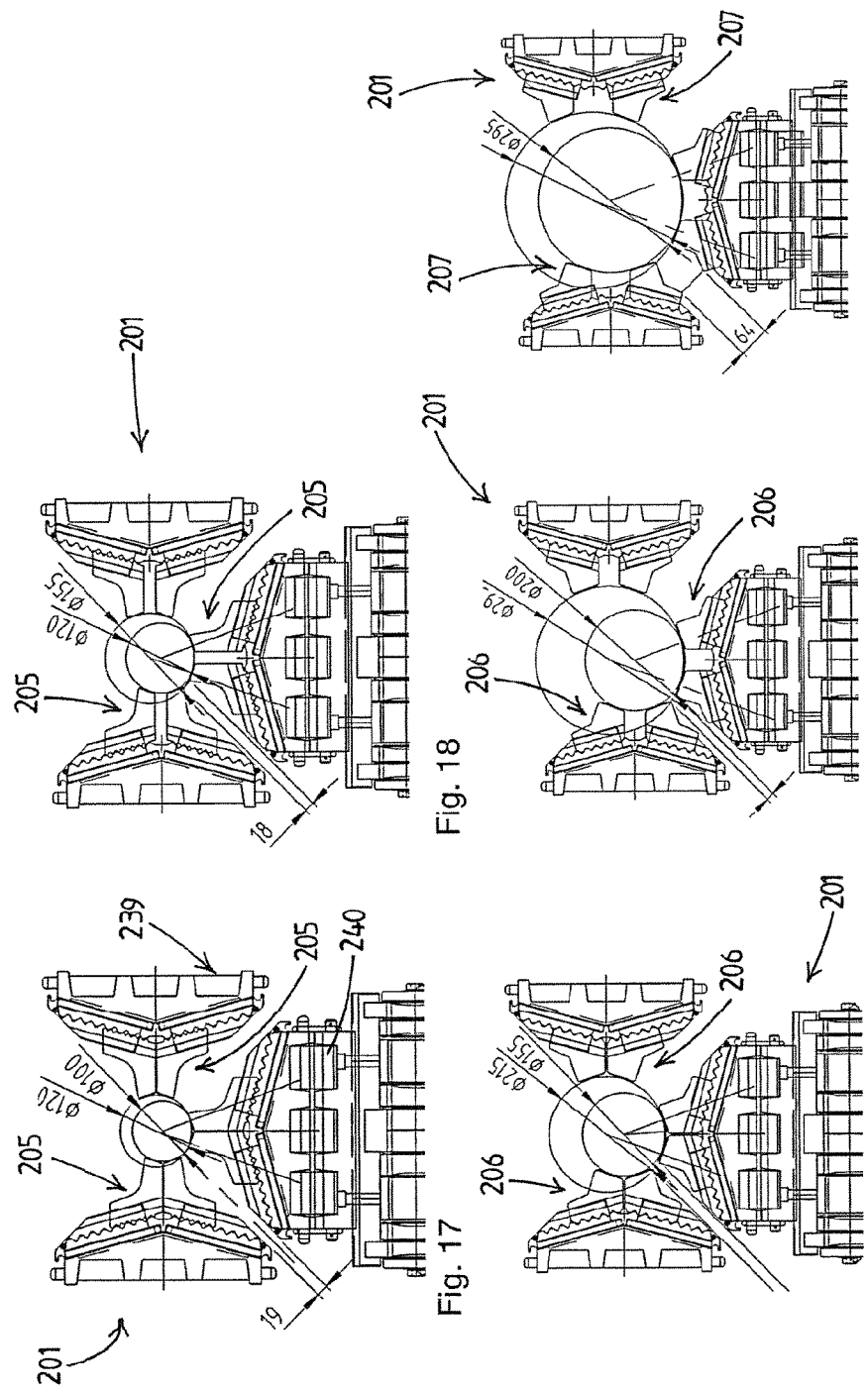

TENSIONER PAD ASSEMBLY

FIELD AND BACKGROUND OF THE INVENTION

The present invention relates to a tensioner pad assembly, for mounting on an endless track of a tensioner to engage an elongated product supported by the tensioner. The invention furthermore relates to a tensioner provided with such pad assemblies, a vessel provided with such a tensioner and the use of such a tensioner.

Tensioners are known from the prior art, for example from WO2009088287 and WO2008007945. Tensioners are for example used in the offshore industry for handling an elongated product from an offshore vessel, such as laying a pipeline for transportation of hydrocarbons (oil, gas, etc.) from board a vessel on the seabed. Tensioners are used for many pipelaying techniques, such as S-lay, Reel lay, J-lay, but may also be embodied and/or used for handling other elongated products, for example hydrocarbon risers, electrical cables, fiberglass cables, umbilicals (e.g. for subsea equipment, ROV, geosurveying tooling, etc) and coiled tubing.

A tensioner is adapted to absorb the load exerted by the elongated product on the tensioner, i.e. to support the weight of the launched product. This is achieved by frictionally clamping the elongated product between multiple track units, the track units comprising endless tracks with gripping pads mounted thereon, to support and move the elongate product. Tensioner having a large "load holding capacity" and in the field capacities of tens of tonnes, or even well over 100 tonnes, for a tensioner are not uncommon.

In a known embodiment a tensioner comprises a tensioner frame and multiple track units mounted in that frame defining an product passage having a passage axis extending axially, and preferably centrally, through the tensioner frame. The number of track units is normally adapted to the capacity and/or product type and common tensioner designs include two, three or four track units (or possibly a variable number of track units).

Each track unit includes a chassis, an endless track supported by the chassis, e.g. with support rollers or other bearing means being mounted on the chassis for supporting the endless track, and a track motion control device for effecting controlled motion of the endless track. The endless track is provided with a multitude of tensioner pads for engaging the elongated product.

It is known to arrange each track unit mobile within the tensioner frame so that the "gap" or "pipeline passage" between the tracks can be adapted to different pipeline diameters. Between the chassis of each track unit and the tensioner frame a connecting structure is provided that at least allows for lateral motion of the track unit with respect to the passage axis so as to adapt the position of the track unit.

Furthermore, the tensioner is provided with squeeze actuators, such as hydraulic cylinders, to create the "squeeze pressure" between the track units and the exterior of the elongated product by pushing the track units towards the product passage. This squeeze pressure is needed to hold the elongated product and absorb the load of the elongated product on the basis of friction.

It will be understood that the "squeeze pressure" needed between the elongated product and the tracks is very significant as the resultant frictional force between grip pads and elongate product might need to be several tens of tonnes, or even well over one hundred tonnes. Frictionally clamping the elongate product furthermore requires an optimal interface between the tensioner and the elongated product, i.e. the pads provided on the track units, engaging the elongate product should match, at least to a certain extent, the circumference, which with most elongate products is defined by the diameter, of the elongate product.

Since typically a pad is adapted to fit a particular type of elongate product, i.e. an elongate product with a particular diameter, a change of product diameter often requires all the pads provided on the tensioner tracks to be replaced. Thus, numerous pads and have to be loosened, replaced and fixed to enable use of the tensioner with a product having a different diameter. A serious handicap of this is the downtime caused by the necessary changeover from one pipe diameter to another. In addition, many types of pads need to be available, and thus on storage, to allow for optimal usage of the tensioner.

It is furthermore noted that tensioners, in particular when used in pipe laying, are often mounted in positions that are not easy accessible, for example high above the working deck of a pipe laying vessel. Thus, replacing the pads on a tensioner not only requires personal to get access to these hard to reach tensioners, but also transporting the new pads to, and the replaced pads from, these locations.

The present invention aims to propose an alternative to the pads used in prior art tensioners. Another object of the invention is to provide a tensioner pad assembly that obviates or at least reduces to a certain extent the abovementioned drawbacks.

SUMMARY OF THE INVENTION

According to the present invention, this object is achieved by providing a tensioner pad assembly according to claim 1.

According to the invention, tensioner pad assembly, adapted to be mounted on an endless track of a tensioner to frictionally clamp an elongated product supported and moved by the tensioner, the pad assembly comprising:
  a carrier member, extending in a longitudinal direction, the carrier member having:
    a base portion, which base portion extends in the longitudinal direction of the carrier member and is adapted to be mounted on a track member of an endless track of the tensioner;
    an imaginary plane, which imaginary plane extends in the longitudinal direction of the carrier and divides the carrier member in a left half and a right half, and
    two gripping member mating surfaces, which gripping member mating surfaces each extend in the longitudinal direction of the carrier member and are located on opposite sides of, and are symmetrically placed relative to, the imaginary plane of the carrier member; and
  a pair of gripping members, each gripping member having:
    a foot, which foot is provided with a carrier member mating surface; and
    a top, which top is adapted to frictionally clamp an outer circumference of the elongated product supported by the tensioner;
      wherein the gripping members are each with their carrier member mating surface releasable mounted in a gripping position on one of the gripping member mating surfaces of the carrier member, such that the gripping members are located on opposite sides of the imaginary plane of the carrier member;

wherein the mating surfaces of the carrier member and the mating surfaces of the gripping members form interlocking structures, which interlocking structures are adapted to transfer a squeeze force, for frictionally clamping the outer circumference of the elongated product with the gripping members, from the carrier member to the gripping members, wherein the interlocking structures of the gripping member mating surfaces define multiple discrete gripping positions for releasable mounting the gripping members, in order to adapt the pad assembly to a diameter of an elongate product to be supported and moved by the tensioner, and wherein the gripping member mating surfaces extend at an angle relative to each other, such that the multiple discrete gripping positions differ in their distance to the base portion as well as in their distance to the imaginary plane of the carrier member.

A tensioner pad assembly according to the invention remedies the before mentioned disadvantages and results in a number of further improvements which become more obvious in the course of the following description.

The tensioner pad assembly comprises a carrier member that supports two gripping members for engaging the outer circumference of an object. By providing an adjustable pad assembly, it is no longer required to change the pads of a tensioner each time a product with a different diameter is to be supported by the tensioner. By changing the gripping position of the gripping members, the pad assembly can be used with a wide range of diameters.

An adaptation of the gripping assembly to different pipe diameters is easily possible since the pair of gripping members may be mounted on the carrier member in different griping positions, i.e. without the need of replacing the gripping pads with gripping pads that match the diameter, and without extensive loosening and fixing of bolts. With a gripping assembly according to the invention, the squeeze force is transferred between the gripping members and the carrier member via the interlocking structures. There is no need for providing additional fixing devices, such as bolts, to transfer the squeeze forces. Thus, the gripping members can be remounted in a different gripping position easily and quickly.

It is noted that in an embodiment according to the invention, the pad assembly further comprises one or more securing devices, such as a pin, bolt or clamping finger, for releasable securing the gripping members to the carrier member in the multiple discrete gripping positions. However, such securing devices are configured for preventing the gripping member from falling out of its gripping position, for example when the track of the track unit changes direction at the end of a track unit. These securing devices are not configured to transfer the squeeze force between the gripping members and the carrier member.

In a further embodiment, the securing devices comprise multiple fastener openings disposed in the gripping member mating surfaces of the carrier member for receiving a mounting pin of the gripping member, for example a pin extending through a faster opening disposed through the gripping member to enable securing the gripping member to the carrier member in multiple gripping positions. Since these mounting pins do not have to transfer the squeeze force between the carrier member and the gripping member, they can be of a compact design, which facilitates handling these pins.

Furthermore, since the mounting pins and the faster openings they are to be disposed in can be of a compact design, they can be provided close together, which allows for providing multiple discrete mounting positions and thus for a wide variety in gripping positions.

According to the invention, the interface between the gripping members and the carrier member they are mounted upon is provided in the form of interlocking structures which, in combination with the gripping member mating surfaces extending at an angle relative to each other, enable an optimal transfer of the squeeze force generated by the tensioner from the carrier member to the pair of gripping members for frictionally clamping an elongated product. In an embodiment the angle between the two gripping member mating surfaces lies in the range of 70-120 degrees, preferably in the range of 80-110 degrees, for example the gripping member mating surfaces may enclose an angle of 90 degrees.

Furthermore, the interlocking structures define multiple discrete gripping positions, in which the gripping members can be supported by the carrier member.

Thus, the invention provides a tensioner pad assembly that provides an alternative to the pads used in known tensioners.

The carrier member is provided with a base portion that is adapted to be mounted on the endless track of a track unit of a tensioner, more in particular to be mounted on a track member of such an endless track. For example, the carrier member can be provided with a shape that fits a track member or a part thereof and the mounting openings for receiving bolts to bolt the carrier member on the track member In another embodiment, the base portion is adapted to be coupled with a clamping plate, such that a track member or a part thereof can be held between the clamping plate and the carrier member.

In an alternative embodiment, an adapter plate can be provided on the track member of the endless track to enable mounting the carrier member on the track member. For example the adapter plate can be provided with mounting openings for receiving bolts, to enable the carrier member to be mounted on the adapter plate.

It is noted that suitable techniques known from the prior art, for example for mounting pads, or parts thereof, on endless tracks, can also be used. For example, between the carrier and the adapter plate can be provided resilient bodies, for resilient support of the carrier member, said resilient support allowing for some tilting of the carrier member when the gripping members first engage the endless object, and thus provide for smooth feeding of the elongated product between the carrier members of the opposed tracks. Also, the engagement surfaces of the adapter plate and carrier member could be slanted, i.e. extend at an angle, with respect to the longitudinal axis of the product passage, such that the engagement surfaces of opposed pad assemblies, i.e. pad assemblies located on opposite sides of the longitudinal product, define a V-shape. With such a configuration the pulling force enacted by the longitudinal product onto the pad assemblies creates a reaction force directed parallel to the longitudinal product and a reaction force perpendicular to the longitudinal products, the latter thus contributing to the clamping force of the tensioner. In an embodiment, the carrier member is provided in the form of a single piece carrier body, for example milled from a steel block. In an alternative embodiment, the carrier member is composed out of different components which are bolted and/or welded together. Thus, the base portion of the carrier member may be a mounting plate having a bottom surface for engagement with the endless track of a track unit, onto which mounting plate two support bodies are mounted which are each provided with a gripping member mating surface.

The gripping members, which are releasable mounted onto the carrier member to allow the tensioner pad assembly to be adapted to a diameter of an elongate product to be held in the product passage.

It is noted that both gripping members engage the elongate product to transfer the squeeze force to that product and thus provide a frictional clamping force which enables the tensioner to support and move the elongate product. Thus, the grip surface provided by the pad assembly is formed by both gripping members.

In an embodiment, each gripping member is provided in the form of a single piece gripping body, for example milled from a steel block. In an alternative embodiment, the carrier member is composed out of different components which are bolted and/or welded together. For example, the gripping member may be provided with a single piece steel body that also forms the foot of the gripping member, which steel body is provided with a hingable mounted steel top for engaging a product. Providing the gripping member with a hingable mounting the top member allows for additional adaptation of the gripping member to the circumference of the product engaged by the pad assembly. In another embodiment, the steel body is provided with a synthetic top cover to enhance the grip of the pad assembly on a particular object.

It is noted that with steel products providing the gripping member with a synthetic contact surface may enhance the grip on that product. Also, with synthetic products, or products having a synthetic surface coating, steel mating surfaces may be preferred to provide optimal grip. Also, the gripping members may be provided with a flexible top surface that during use sets to the particular contact surface of the product engaged.

In an embodiment the top of the gripping member is provided with a grip surface to frictionally clamp an outer circumference of the elongated product supported by the tensioner, which grip surface of the gripping body is provided in the form of a interchangeable part, such that the gripping member can be provided with different types of grip surface, to enable the grip surface of the gripping member to match with the surface properties of the tubular held in the product passage.

In an embodiment according to the invention, the gripping members have a height such that when mounted in any of the available gripping positions, the top end of the gripping member extends above the carrier member to such an extent that the contour of a product engaged by the gripping members does not contact the carrier member.

In an embodiment, the gripping members mating surfaces extend up to the middle of the carrier member, such that gripping member mating surfaces have top ends that border each other.

In an alternative embodiment according to the invention the carrier member is provided with a flat top, or with a recess, between the top ends of the gripping member mating surfaces, to thus prevent the carrier member to come into contact with the contour of a product engaged by the gripping members. In such an embodiment, the gripping member mating surfaces are spaced from each other at their top ends by the flat top or recess.

In an embodiment according to the invention, the length of a gripping member in the direction parallel to the imaginary plane, is substantially similar to the length of a chain member of an endless chain of a track onto which the pad assembly is to be mounted. Thus, when the endless chain of the tensioner is provided with pad assemblies, there is only a limited space between the gripping members of the subsequent pad assemblies, which allows for an optimal grip on the product to be supported by the tensioner.

In an embodiment, a carrier body is provided with one gripping member mating surface on each side, and each gripping member is configured such that it extends in the longitudinal direction of the carrier member along the entire length of the mating surface. In an alternative embodiment, the carrier member is configured to support a row of multiple gripping members on each side. For example the gripping member mating surfaces may have a length that is multiple times the length of a gripping member, thus allowing a row of for example three gripping members to be mounted on said mating surfaces, said rows of gripping members extending in the longitudinal direction of the carrier body. In an alternative embodiment, a single carrier member is provided with a row of multiple mating surfaces, each for supporting a single gripping member in multiple gripping positions. In yet another embodiment, the carrier body is on both sides provided with a row of gripping member mating surfaces and the gripping members are provided with corresponding rows of mating surfaces, such that the gripping members, when mounted on the carrier body, are coupled with the carrier body via multiple mating surfaces.

The gripping member mating surfaces and the gripping members are provided symmetrically relative to this imaginary plane of the carrier member. Preferably, the tensioner pad assembly is mounted on a tensioner such that the imaginary plane comprises a central passage axis of the product passage of the tensioner when the tensioner is in use. Since the central axis of a product supported by the tensioner typically coincides with the central axis of the product passage, the gripping members are thus optimally positioned to clampingly engage the product. The action line of the resulting clamping force transferred by the gripping members lies in the imaginary plane and intersects the central axis of the product passage, and thus the central axis of the product supported in the product passage.

The outward facing mating surfaces of the carrier member are provided on opposite sides of the imaginary plane and at an angle to each other and to the imaginary plane, such that changing the gripping position of the gripping members changes the distance between the gripping members as well as the distance between gripping members and the base portion of the carrier member.

It is noted that according to the invention, the gripping members can be positioned in multiple discrete gripping positions. More in particular, the mating surfaces of the carrier member and the gripping members allow for positioning each of the gripping members in an inner gripping position, an outer gripping position, and one or more discrete gripping positions between the inner gripping position and the outer gripping position. When in their inner gripping positions, the gripping members are located near to each other. When located in their outer gripping positions, the gripping members are located away from each other. Furthermore, the gripping member mating surfaces face outward, that is away from each other and away from the imaginary plane, and flank the carrier member. Thus, when the gripping members are moved away from each other, i.e. are mounted in gripping positions located further away from the imaginary plane, they are also moved towards the base portion of the carrier member.

Typically, positioning the gripping members away from each other is beneficial for stable engaging an elongate product with a large diameter, while poisoning the gripping members closely near each other is beneficial for engaging a product with a small diameter.

By providing the mating surfaces facing outward, it is achieved that when the top ends of the gripping members are located in their outer gripping position, they are also located closely to the base portion of the carrier member. Thus, the pad assembly is provided with a short and wide configuration, which is beneficial for stable supporting products with a wide diameter and allows such a product to be supported by the tensioner without the need of the track units to be pulled far backwards, i.e. away from the product passage, to provide a sufficiently wide product passage. Thus, products with a large diameter can be supported by a compact tensioner when using a pad assembly according to the invention.

Furthermore, by providing the mating surfaces facing outward, it is achieved that the top ends of the gripping members are located closely adjacent each other, and away from the base portion of the carrier member, when the gripping members are mounted in their inner gripping position, i.e. the position closest to the imaginary plane. Thus, the pad assembly is provided with a narrow and pointed configuration, this in turn allows for the gripping members to be located more closely to the gripping members of an adjacent pad assembly, i.e. gripping members of a pad assembly located on an adjacent tensioner track, and thus enables the tensioner to better support products with a more narrow diameter.

Thus, by providing the gripping member mating surfaces facing outward, it is achieved the gripping members, when mounted in a gripping position for engaging a product with a narrow diameter, extend way beyond the carrier member, and the distance between the top ends of the gripping members and the base portion of the carrier member is large. On the other hand, when mounted in a gripping position for engaging a product with a wide diameter, the gripping members do not extend that far beyond the carrier member, and the distance between the top ends of the gripping members and the base portion of the carrier member is smaller. This is beneficial because it makes the range of movement of the tensioner track units relative to the product passage a less critical factor when using a tensioner with products having different diameters.

In prior art tensioners, when engaging an elongated product with a different diameter, in addition to changing the pads, often the track units need to be moved closer to or further away from the product passage. Providing the track units with a large working range also requires the use of large range actuators for proving the gripping force. Since actuators with a large working range are more expensive than actuators with a smaller working range, providing the gripping member mating surfaces of the carrier member facing outward allows for a reduction in cost of a tensioner. Furthermore, it allows for a more compact tensioner that can handle a similar range of product diameters.

The interlocking structures of the mating surfaces may be, for example, a desired teething or some other consistently arranged formation or repeating pattern which enables retaining the gripping member in a desired gripping position relative to the carrier member.

To enable transfer of load forces from the carrier member to the gripping members the interlocking structures have load bearing surfaces. These load bearing surfaces are the surfaces that bear the load when the gripping members are pushed against an object. For example, when the interlocking structures are provided in the form of teeth, the load bearing surfaces of the teeth provided on the gripping member mating surfaces, are the flanks of the teeth facing towards the imaginary plane. The load bearing surfaces of the teeth provided on the carrier member are those surfaces that are in contact with the load bearing surfaces of the gripping member mating surfaces, i.e. the flanks of the teeth that face away from the imaginary plane. In an embodiment, the load bearing surfaces of the interlocking structure and the griping member mating surface of the carrier member, i.e. the surface of the carrier member that is provided with the interlocking structure, enclose an angle of 90 degrees or less. Preferably this angle is less than 90 degrees, for example 80 degrees or 75 degrees. In such an embodiment, the gripping member can not be lifted out of its gripping position in a direction perpendicular to the gripping member mating surface, but has to be lifted out of its gripping position in a direction at an angle to the gripping member mating surface. Thus, when the gripping member is in gripping contact with a product in the product passage, it is locked in its gripping position on the carrier member.

In an embodiment, the interlocking structures comprise teething and mating grooves, and the load bearing surfaces of the interlocking structures are provided on the sides of the teething and corresponding grooves. In an embodiment, the teeth and grooves extend in a direction parallel to the imaginary plane of the carrier member. In an alternative embodiment, the teeth and/or grooves extend at an angle with the imaginary plane.

In an embodiment the teeth and/or grooves provided on the mating surfaces of the carrier form a wave like pattern of which the wave front is directed at a non right angle relative to the imaginary plane. In a further embodiment, the teeth and/or grooves provided on of the first mating surface in combination with the teeth and/or grooves provided on of the second mating surface define a V-shaped contour, which V-shape is dissected by the imaginary plane and which V points downwards when the gripping member are in gripping contact with the elongate product in the product passage. In such an embodiment, the teeth and/or grooves support the gripping member in a direction parallel to the longitudinal axis of the product passage.

Furthermore, providing the mating surfaces with interlocking structures allows for providing a large general load bearing contact surface, the general load bearing contact surface being formed by the load bearing contact surfaces of the interlocking structures, in combination with multiple discrete gripping positions located close together, for example by providing the mating surface in the form of many narrow teeth. This in turn allows for more precise adjustability of the gripping members, and thus for better engagement of the product in supported by the tensioner.

In a further embodiment, the pad assembly according to the invention comprises multiple pairs of gripping members, each dedicated to a particular range of products, more in particular to a particular range of product diameters. Thus, the range of products to be handles by the pad assembly can be further increased. The pairs of gripping members may differ in the shape, dimension and/or material of the gripping members.

In such an embodiment, the for example the gripping member mating surfaces, more in particular the interlocking structures provided on the gripping member mating surfaces, define sixteen gripping positions, of which the five inner most gripping positions are to be used with a first set of gripping members, the fourth-twelfth gripping positions are to be uses with the second set of gripping members and the tenth-sixteenth gripping positions are to be used in combination with a third pair of gripping members.

It is noted subsequent gripping positions may overlap, i.e. part of the interlocking structure defining a first gripping position also defines the second gripping position. For example, an interlocking structure of a gripping member mating surface may comprise ten parallel teeth, while the interlocking structure of the associated gripping member comprises six corresponding grooves. Thus, a single gripping position comprises six teeth. The gripping member mating surface thus potentially defines five discrete gripping positions. In such an embodiment, five of the six teeth that engage the grooves of the gripping member when mounted in its first gripping position also engage grooves of that gripping member when it is mounted in its second gripping position, i.e. part of the interlocking structure defining a first gripping position also defines the second gripping position.

Furthermore it is noted that, due to the configuration of the gripping member, for example the height of the gripping member relative to the height of the carrier member and/or the configuration of the carrier member and/or the securing device for securing the gripping members, the actual number of gripping positions that are usable with a particular gripping member may be less than the potential number of gripping positions defined by the gripping member mating surface.

In an embodiment, the mating surfaces of the carrier member are each flanked by rib elements for positioning the gripping member on the gripping member mating surface, preferably locking the gripping member against movement in a direction parallel to the imaginary plane of the carrier member. In a further embodiment, the gripping member is provided with compliant recesses, preferably provided with bevelled portions, for receiving those rib elements, to facilitate mounting the gripping member between the flanking rib elements.

In addition to the flanking rib elements, or as an alternative, the mating surfaces can be provided with one or more rib elements, which rib elements may extend beyond the interlocking structure for engaging a corresponding recess provided in the mating surface of the carrier member, to guide the gripping member relative to the carrier member when mounting it in its gripping position.

In an embodiment according to the invention, the interlocking structures comprise converging interlocking members, such teeth or grooves having a substantially triangular or trapezium shaped cross section, to facilitate mating the interlocking structures, and thus facilitate mounting a gripping member in a gripping position.

In an embodiment of a pad assembly according to the invention, the gripping member has an outside surface, which, when the gripping member is mounted in a gripping position, faces away from the carrier member, and an inside surface, which, when the gripping member is mounted in a gripping position, faces towards the carrier member, which inside and outside surface converge towards each other towards the top of the gripping body. Thus, the gripping member is provided with a substantially trapezium shaped cross section, which is in particular beneficial in providing the pad assembly with a narrow and pointed configuration when the gripping members are provided in an inner gripping position, i.e. a gripping position located near the imaginary plane. This in turn allows for the gripping members to be located more closely to the gripping members of an adjacent pad assembly, i.e. gripping members of a pad assembly located on an adjacent tensioner track, and thus enables the tensioner to better support products with a more narrow diameter.

In an embodiment, the pad assembly further comprises a resilient body, for example a polyurethane body, which resilient body is part of the carrier member, for example is provided between the gripping member mating surfaces and the base portion, to resiliently support the gripping members.

As an alternative, or in addition, the gripping members can be provided with a resilient body, for example a polyurethane member provided between a steel foot portion and a steel top portion, for providing the top portion of the gripping members with some resiliency to enable the top portion to set relative to the circumferential surface of the product when the tensioner applies a squeezing force.

It is noted that "resilient" in this context is a relative term, i.e. is considered to mean more flexible than steel, but not as flexible as for example rubber. It is noted that in known tensioner pads resilient bodies, for example helical springs, are used for the same purpose. It is therefore submitted that the information disclosed in this document in combination with the knowledge of the skilled person enable the skilled person to provide the pad assembly according to the invention with resilient supported gripping members, and/or gripping members with a resiliently supported top portion.

In a further embodiment, the mating surfaces of the carrier member enclose an angle in the range of 30 degrees up to 60 degrees, preferably in the range of 40 degrees up to 50 degrees, for example enclose an angle of 45 degrees. An angle in this range combines an optimal balance between a range of movement of the gripping members in a lateral direction, i.e. movement towards and away from each other, and a range of movement of the gripping members in a radial direction, i.e. movement along the imaginary plane towards and away from a product passage of a tensioner.

The invention furthermore provides a tensioner comprising pad assemblies according to the invention.

In an embodiment, the tensioner for handling an elongated product, such as a pipeline in pipeline installation or an umbilical, the tensioner comprises:
  a tensioner frame,
  multiple track units mounted in said frame at positions
    distributed around an product passage having a passage
    axis,
  wherein each track unit comprises a chassis, an endless track supported by said chassis and track motion control means for effecting controlled motion of the endless track, the endless track being provided with a multitude of pad assemblies, each adapted to engage on the elongated product,
  and wherein for each track unit one or more squeeze actuators are provided between the tensioner frame and the chassis of the track unit,
  and wherein an actuator control device is provided which is associated with said one or more squeeze actuators and allows to control the squeeze force exerted by the pad assemblies on the elongated product, wherein each of the pad assemblies comprises:
    a carrier member, extending in a longitudinal direction, the carrier member having:
      a base portion, which base portion extends in the longitudinal direction of the carrier member and is mounted on a track member of an endless track of the tensioner;
      an imaginary plane, which imaginary plane extends in the longitudinal direction of the carrier and divides the carrier member in a left half and a right half, and which imaginary plane comprising the passage axis when the tensioner is in use;

two gripping member mating surfaces, which gripping member mating surfaces each extend in the longitudinal direction of the carrier member and are located on opposite sides of, and are symmetrically placed relative to, the imaginary plane of the carrier member; and a pair of gripping members, each gripping member having:
- a foot, which foot is provided with a carrier member mating surface; and
- a top, which top is adapted to frictionally clamp an outer circumference of the elongated product supported by the tensioner;
    wherein the gripping members are each with their carrier member mating surface releasable mounted in a gripping position on one of the gripping member mating surfaces of the carrier member, such that the gripping members are located on opposite sides of the imaginary plane of the carrier member for engaging an outer circumference of the elongated product supported in the product passage;
    wherein the mating surfaces of the carrier member and the mating surfaces of the gripping members form interlocking structures, which interlocking structures are adapted to transfer a squeeze force, for frictionally clamping the outer circumference of the elongated product with the gripping members, from the carrier member to the gripping members,
    wherein the interlocking structures of the gripping member mating surfaces define multiple discrete gripping positions for releasable mounting the gripping members, in order to adapt the pad assembly to a diameter of an elongate product to be supported and moved by the tensioner, and
    wherein the gripping member mating surfaces extend at an angle relative to each other, such that the multiple discrete gripping positions differ in their distance to the base portion as well as in their distance to the imaginary plane of the carrier member.

In such a tensioner, the track units are preferably mounted mobile within the associated frame, such that they can be moved towards and away from the product passage. In an embodiment of a tensioner according to the invention, between each track unit and the tensioner frame a connecting structure is provided that at least allows for lateral motion of the track unit so as to adapt the position of the track unit to the product diameter. For example, in an embodiment the squeeze actuators are configured to also adapt the position of the track unit relative to the product passage to adjust for a change in diameter of the product to be supported and moved by the tensioner.

It is noted that the tensioner can be mounted with its product track extending in a substantially horizontal direction, for example in the case of S-lay, and with its product track extending in a substantially vertical position, for example in the case of J-lay.

The invention furthermore provides a vessel comprising a tensioner comprising pad assemblies according to the invention.

The invention furthermore provides the use of a tensioner comprising pad assemblies according to the invention for handling a tubular product, such as a pipeline in pipeline installation or an umbilical.

The invention furthermore provides method for adapting a pad assembly according to the invention, preferably while mounted on a tensioner, to the circumference of an elongated product to be supports and moved by the tensioner, for example a tubular, the method comprising the steps:
- optionally: releasing any gripping member securing devices securing a first one of the two gripping members in a first gripping position;
- lifting the first gripping member out of its gripping position;
- lowering the first gripping member into a second gripping position;
- optionally: securing any gripping member securing devices to secure the first gripping member in the second gripping position;
- optionally: releasing any gripping member securing devices securing a second one of the two gripping members in a first gripping position;
- lifting the second gripping member out of its gripping position;
- lowering the second gripping member into a second gripping position; and
- optionally: securing any gripping member securing devices to secure the second gripping member in the second gripping position.

Further objects, embodiments and elaborations of the apparatus and the method according to the invention will be apparent from the following description, in which the invention is further illustrated and elucidated on the basis of a number of exemplary embodiments, with reference to the drawings.

BRIEF DESCRIPTION OF THE DRAWINGS

In the drawings:

FIG. 3 shows a cross sectional view of part of a tensioner provided with the pad assembly of FIG. 1, the pad assemblies engaging an elongate product having a first cross section;

FIG. 4 shows a cross sectional view of the pad assembly of FIG. 1, in three working positions;

FIG. 5 shows a cross sectional view of pad assemblies of FIG. 1 engaging an elongate product having a second cross section;

FIG. 6 shows a cross sectional view of part of a tensioner provided with the pad assembly of FIG. 1, the pad assembly comprising different sized gripping members, the pad assemblies engaging an elongate product having a third cross section;

FIG. 7 shows a cross sectional view of the pad assembly of FIG. 6, in three working positions;

FIG. 8 shows a cross sectional view of pad the assemblies of FIG. 6 engaging an elongate product having a fourth cross section;

FIG. 9 shows a cross sectional view of the pad assembly of FIG. 1, the pad assembly comprising different sized gripping members, the pad assemblies engaging an elongate product having a fifth cross section;

FIG. 10 shows a perspective view of part of a tensioner provided with pad assemblies of FIG. 1;

FIG. 17 shows a cross sectional view of part of a tensioner provided with a further alternative pad assembly according to the invention with the pads in a first working position;

FIG. 18 shows the tensioner and pad assembly of FIG. 17 with the pads in a second working position;

FIG. 19 shows the tensioner and pad assembly of FIG. 17 with an alternative set of pads in a first working position;

FIG. 20 shows the tensioner and pad assembly of FIG. 19 with the pads in a second working position; and FIG. 21 shows the tensioner and pad assembly of FIG. 17 with an alternative set of pads in a first working position.

A tensioner pad assembly according to the invention is adapted to be mounted on an endless track of a tensioner to frictionally clamp an elongated product supported and moved by the tensioner.

Figure 1:
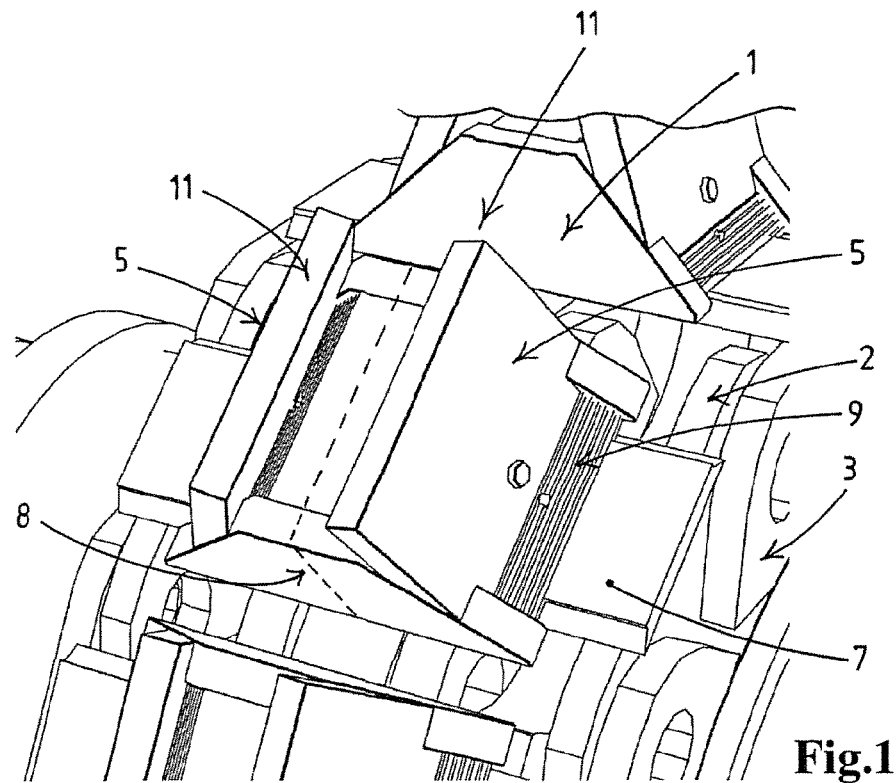
FIG. 1 shows a perspective view of an exemplary pad assembly according to the invention.
Figure 2:
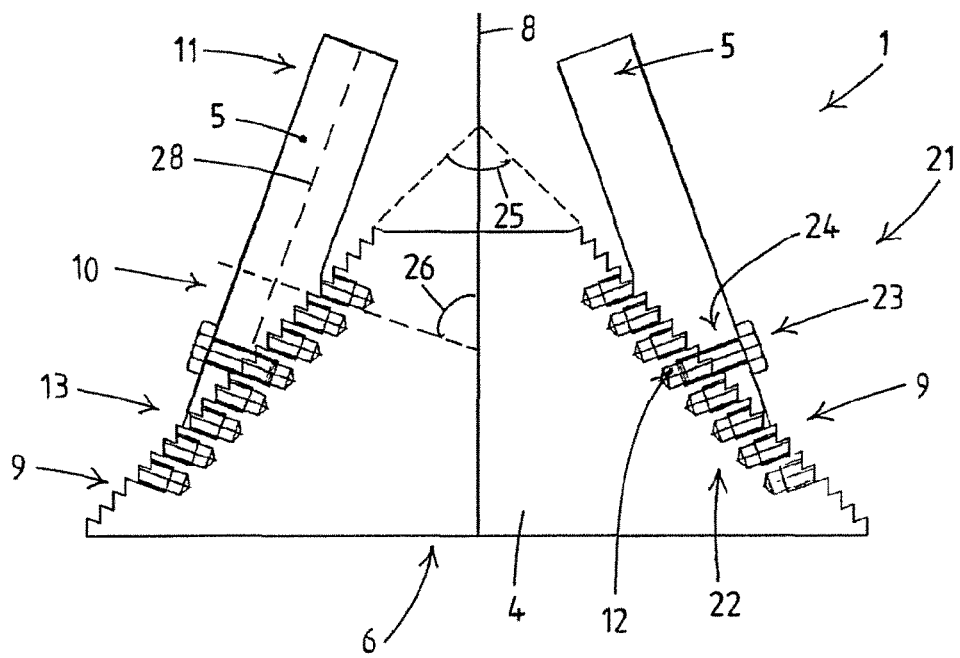
FIG. 2 shows a cross sectional view of the pad assembly of FIG. 1.

FIG. 1 shows a perspective view of an exemplary pad assembly 1 according to the invention, mounted on a track member 2 of an endless track 3 of a tensioner. FIG. 2 shows a cross sectional view of the pad assembly 1. FIG. 10 shows a perspective view of a larger part of the endless track 3 provided with pad assemblies 1. FIG. 5 shows a cross sectional view of pad assemblies 1 engaging an elongated product 14 having a first cross section.

The pad assembly 1 comprises a carrier member 4 and two gripping members 5. The carrier member 4 extends in a longitudinal direction, which longitudinal direction is parallel to the direction of movement of the endless track 3.

The carrier member 4 has a base portion 6 which is adapted to be mounted on the track member 2, in the particular embodiment shown is mounted on a mounting plate 7 of the track member 2, of the endless track 3 of the tensioner.

The carrier member 4 is provided with two gripping member mating surfaces 9, which gripping member mating surfaces each extend in the longitudinal direction of the carrier member. The gripping member mating surfaces 9 furthermore extend at an angle relative to each other, which angle 25 is depicted in the cross sectional view shown in FIG. 2.

In the particular embedment shown, the gripping member mating surfaces 9 face outward and flank the carrier member 4. The mating surfaces thus face away from each other and provide the carrier member with a substantially trapezium shaped cross section.

The carrier member 4 has an imaginary plane 8, indicated in FIG. 2, which imaginary plane extends in the longitudinal direction of the carrier and divides the carrier member in a left half and a right half. The gripping member mating surfaces are symmetrically placed relative to the imaginary plane 8 of the carrier member, which is thus located between those mating surfaces.

The two gripping members 5 each have a foot 10 and a top 11. The feet 10 are each provided with a carrier member mating surface 12. The top 11 of the griping members 5 is adapted to frictionally clamp an outer circumference of an elongate product supported by the tensioner.

The gripping members 5 are each with their carrier member mating surface 12 releasable mounted in a gripping position on one of the gripping member mating surfaces 9 of the carrier member 4, such that the gripping members are located on opposite sides of the imaginary plane 8 of the carrier member. This is depicted in FIG. 2.

It is noted that, since the gripping members 5 in FIGS. 1 and 2 are depicted in their mounted state, the carrier mating surfaces 12 are not visible. The gripping member mating surface 9, located on the carrier member, is partially visible in FIG. 1.

The mating surfaces 9 of the carrier member 4 and the mating surfaces 12 of the gripping members 5 form interlocking structures 13, which interlocking structures are adapted to transfer a squeeze force, for frictionally clamping the outer circumference of the elongated product with the gripping members 5, from the carrier member 4 to the gripping members 5.

In the exemplary embodiment shown, the interlocking structures are provided in the form of parallel, interlocking teeth 13, which is visible in the cross sectional view shown in FIG. 2. The teeth extend in a direction parallel to the longitudinal direction of the carrier member, and thus parallel to the direction of movement of the tensioner track onto which the carrier member has been mounted. In an alternative embodiment according to the invention, the mating surfaces are provided with an interlocking structure in the form of teeth that extend along a curved trajectory, for example in the form of a wave like pattern, an interlocking structure in the form of for example multiple cones and conical shaped recesses. Many other configurations are also possible.

The interlocking structures 13 of the gripping member mating surfaces 9 furthermore define multiple discrete gripping positions for releasable mounting the gripping members 5. Thus, the gripping members can be mounted on the carrier member in multiple discrete gripping positions, which allows the pad assembly 1, and thus the tensioner provided with the pad assembly, to be adapted to a diameter of an elongate product to be supported and moved by the tensioner.

The gripping member mating surfaces 9 extend at an angle relative to each other, which angle 25 is depicted in the cross sectional view shown in FIG. 2. Therefore, the multiple discrete gripping positions differ in their distance to the base portion 6 as well as in their distance to the imaginary plane 8 of the carrier member 4.

FIG. 4 shows a cross sectional view of the pad assembly 1 with the gripping members 5 in three different gripping positions. The left figure depicts the gripping members 5 mounted in an inner gripping position on the carrier member 4, in which inner gripping position the gripping members are located near the imaginary plane 8, for engaging an elongated product with a small cross section. The right figure depicts the gripping members mounted in an outer gripping position, in which outer gripping position the gripping members 5 are located away from the imaginary plane 8, for engaging an elongated product with a large cross section. The middle figure shows the gripping members 5 mounted on the carrier member 4 in an intermediate gripping position, for engaging an elongated product with an intermediate cross section.

FIG. 5 shows a cross sectional view of pad assemblies of FIG. 1 with the gripping members 5, which are mounted in an intermediate gripping position on the carrier member 4, engaging an elongate product 14 having an intermediate cross section. FIG. 3 shows a cross sectional view of part of a tensioner, of which only parts of the track members 2 of the endless tracks are shown, provided with the pad assembly of FIG. 1. In the FIG. 3 the gripping members 5 are mounted in an inner gripping position, engaging a product with a narrow cross section, which product is held in a product passage 29 having a product passage axis 30. The product is held by the tensioner, which applies a squeeze force onto the product by pressing the pad assemblies against the product. From this cross sectional top view of the tensioner it is clear that the imaginary plane 8 of the carrier members 4 comprises the product passage axis 30.

Also, since the tensioner is provided with four track units, in opposing pairs, the imaginary planes of pad assemblies located on opposite sides of the product passage overlap, thus the two pad assemblies share a single imaginary plane. It is noted that in alternative embodiments, a tensioner is provide with for example three or five tracks located at regular intervals around the product passage. In such an embodiment, the imaginary planes will not overlap.

According to the invention, the adjustable gripping members 5 function as a gripping pad for engaging the elongate product 14 supported by the tensioner. Providing the gripping pad in the form of two individual gripping members 5, mounted on opposite sides of the imaginary plane 8 on the gripping member mating surfaces 9 that extend at an angle relative to each other, allows to adjust the form of the gripping pad to fit the diameter of a particular elongated product to be supported by the tensioner. Thus, there is no need for replacing the gripping pad each time a tubular of different diameter needs to be supported, and it is no longer required to hold many different sized gripping pads in storage.

The exemplary embodiment of a pad assembly 1 shown comprise not a single pair of gripping members 5, but three pairs of gripping members. The gripping members differ in size and shape, and are adapted to be used with elongated products of different diameter. In the particular embodiment shown, the gripping members differ in width. The gripping members for supporting products with a large diameter are provided with a large cross section to enable the transfer of large squeeze forces which are required when supporting heavy products.

FIGS. 3 and 5 show the gripping assembly 1 with the first pair of gripping members 5 in different gripping positions, engaging an elongated product with a first diameter and engaging a elongated product with a second diameter.

FIGS. 6-8 show the gripping assembly 1 with a second pair of gripping members 16 in different gripping positions, similar to the gripping positions shown in FIGS. 4-6.

FIG. 6 shows a cross sectional view of part of the tensioner provided with the pad assembly 1, the different sized gripping members 19 engaging an elongate product 16 having a third cross section. FIG. 8 shows a cross sectional view of pad assemblies 1 provided with the gripping members 16 engaging an elongate product 17 having a fourth cross section.

FIG. 9 shows a cross sectional view the pad assembly 1, the pad assembly comprising third pair of gripping members 20, the pad assemblies engaging an elongate product 18 having a fifth cross section.

The first, second and third pair of gripping members 6,19,20 are adapted to handle different ranges of elongated products, i.e. products with different diameters.

The gripping members 16 shown in FIGS. 1-5 are adapted to handle elongated products having a comparatively narrow diameter. These gripping members are comparatively long and narrow which allows them protrude far into the product passage. Thus, the tensioner can engage products with a narrow cross section without the tensioner tracks to be moved close to the center of the product passage.

The gripping members 19 shown in FIGS. 6-8 are adapted to handle elongated products having a comparatively intermediate diameter. These gripping members are shorter and wider than the gripping members shown in FIGS. 1-5. Their larger cross section allows for the transfer of a larger squeeze force, and thus for the tensioner to support heavy products than is possible with the gripping members shown in FIGS. 1-5.

The gripping members 20 shown in FIG. 9 are adapted to handle heavy products with a large diameter. It is noted that the gripping members 20 are dimensioned such that they can only be poisoned in only a single gripping position. These gripping members enable the tensioner to be used in exceptional cases, that is in cases in which a product with an exceptional large diameter and/or of exceptional large weight needs to be supported.

It is observed that the working range of the first and second set of gripping members partially overlap. When the gripping members 5 of the first pair are in the intermediate position shown in FIG. 5, they can engage a product 15 having a diameter that is larger than the diameter of the product 16 engaged by the second pair of gripping members 19, mounted in their most inner gripping position, shown in FIG. 6.

It is observed that in addition to changing the gripping position of the gripping members, the position of the endless tracks relative to the product may also be adjusted to adapt a tensioner for use with a product having a different diameter.

It is noted that the gripping assembly 1 is provided with a securing devices 21 for releasable securing the gripping members 6, 19, 21 to the carrier member 4 in the multiple discrete gripping positions. In the exemplary embodiment shown, see for example FIG. 2, the securing device comprises multiple fastener openings 22 disposed in the mating surfaces of the carrier member 4 for receiving a mounting pin 23 of the gripping member, more in particular a bolt extending through a faster 24 opening disposed through the gripping member to enable securing the gripping member to the carrier member in multiple gripping positions.

It is noted that depending on the shape and size of the gripping member, the securing device may differ. For example, larger gripping members may be secured with two instead of one bolt, as is shown in FIG. 9. Also, fastener openings may be disposed in patterns in the gripping member mating surfaces and in the gripping member to provide multiple intermediate securing positions, i.e. positions in which the gripping member can be secured. For example the fastener opening sin the gripping member mating surface may be provided in two parallel rows of staggered openings, and the gripping member with two openings, one for securing the carrier member in an opening of the first row and one for securing the carrier member in the second row. Thus, for example a first, third and fourth securing position are achieved by securing the gripping member of respectively a first second and third opening of the first row, using the first faster opening in the gripping member. A second and third securing position are achieved by securing the gripping member in respectively a first and second opening of the second row using the second fastener opening of the gripping member.

To adapting a pad assembly to the circumference of a tubular, for example change between the configurations shown in FIG. 4, the gripping member securing devices 21 securing a first one of the two gripping members 5 in a first gripping position are released, after which the first gripping member can be lifted out of its gripping position.

The gripping member 5 is then lowered into a second gripping position, after which the gripping member securing devices 21 are secured again to secure the first gripping member in the second gripping position.

Subsequently the gripping member securing devices 21 securing the second one of the two gripping members 5 in a first gripping position are released, and the second gripping member 4 is lifted out of its gripping position.

The second gripping member is lowered into a second gripping position, matching the second gripping position of the first gripping member, after which the gripping member securing devices 21 are secured to secure the second gripping member in the second gripping position.

According to the invention, the interface between the gripping members and the carrier member they are mounted upon is provided in the form of interlocking structures which, in combination with the gripping member mating surfaces extending at an angle relative to each other, enable an optimal transfer of the squeeze force generated by the tensioner from the carrier member to the pair of gripping members for frictionally clamping an elongated product. In an embodiment the angle between the two gripping member mating surfaces lies in the range of 70-120 degrees, preferably in the range of 80-110 degrees. In the exemplary embodiment shown, the gripping member mating surfaces enclose an angle 25 of 90 degrees.

It is observed that according to the invention, the squeeze force generated by the tensioner are transferred between gripping members and carrier member via the interlocking structures. In the embodiment shown, the interlocking structures, which also enable retaining the gripping member in a desired gripping position relative to the carrier member, are provided in the form of teething.

Of the teeth 13 provided on the carrier member 4, shown in FIG. 1, the load bearing surfaces 27, i.e. the surfaces bearing the load when the gripping members are pushed against an object, are the sides of the teeth facing the imaginary plane 8. The load bearing surfaces of the gripping member mating surfaces extend at an angle 26 relative to the imaginary plane 8.

When the tensioner holds an object between the gripping members, the squeeze force is transferred between the gripping members and the carrier member via the load bearing surfaces of the interlocking structure of the grip members and the load bearing contact surfaces of the interlocking structure of the carrier member.

The interlocking structures of the gripping member mating surfaces provide the gripping members and the carrier member with large contact surfaces for transferring a squeeze force from the carrier member to the gripping members while enabling each of the gripping members to be mounted on the carrier member in multiple discrete gripping positions, in order to adapt the pad assembly to a diameter of an elongate product to be held in the product passage.

In the preferred embodiment shown the load bearing surfaces extend substantially perpendicular to the line of action 28 of the squeeze force transferred by the particular gripping member 5. Thus, the load bearing surfaces of the interlocking structure provided on the gripping member and the load bearing surfaces of the interlocking structure provided on the carrier member are pushed onto each other without any substantial forces acting in a direction parallel to those load bearing surfaces.

In an alternative embodiment the load bearing surfaces extend at an angle to the line of action of the squeeze force transferred by the particular gripping member, such that a force component of the squeeze force extends parallel to the load transfer surfaces and towards the gripping member, such that the gripping members, when loaded under the squeeze force, are pushed against into their interlocking connection with the gripping member.

In a further embodiment, the mating surfaces of the carrier member enclose angle in the range of 30 degrees up to 60 degrees, preferably in the range of 40 degrees up to 50 degrees, for example enclose an angle of 45 degrees. An angle in this range combines an optimal balance between a range of movement of the gripping members in a lateral direction, i.e. movement towards and away from each other, and a range of movement of the gripping members in a radial direction, i.e. movement along the imaginary plane towards and away from the product passage.

In an embodiment, the load bearing surfaces of the interlocking structures and the gripping member mating surface, i.e. the surface defined by the interlocking structure of the carrier member, enclose an angle of 90 degrees or less, for example 80 degrees or 75 degrees. In such an embodiment, the gripping member can not be lifted out of its gripping position in a direction perpendicular to the mating surface, but has to be lifted out of its gripping position in a direction at an angle to the mating surface. Thus, when the gripping member is in gripping contact with a product in the product passage, it is locked in its gripping position on the carrier member.

In the embodiment shown, the teeth 13 of the interlocking structures extend along a line parallel to the imaginary plane 8 of the carrier member 6, see for example FIG. 1. In an alternative embodiment, the teeth and/or grooves extend at an angle with the imaginary plane. Furthermore, in the embodiment shown, each of the teeth extends along a straight line. In an alternative embodiment, the teeth, or parts thereof, extend along a jagged line or a curved line, and/or the teeth may be subdivide into multiple sub teeth.

Figure 11:
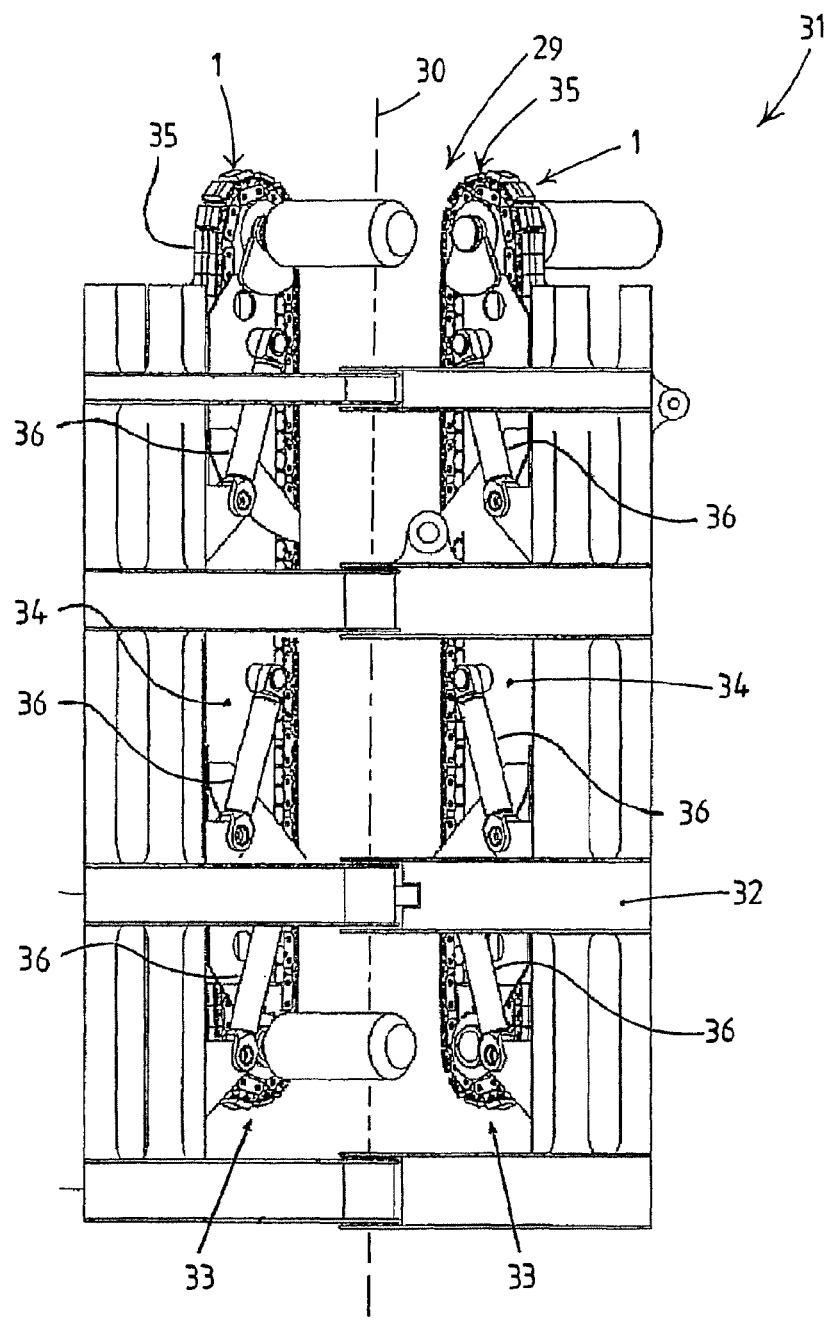
FIG. 11 shows a tensioner provided with pad assemblies according to the invention.

FIG. 11 shows a tensioner 31 for handling elongated products, such as a pipeline in pipeline installation or an umbilical, which tensioner is provided with pad assemblies 1, which are schematically depicted in the figure, according to the invention.

The tensioner 31 comprises a tensioner frame 32 and multiple track units 33, of which tow are depicted, mounted in that frame at positions distributed around a product passage 29 having a product passage axis 30.

Each track unit 33 comprises a chassis 34, an endless track 35 supported by said chassis and track motion control means 36 for effecting controlled motion of the endless track. The endless track 35 is provided with a multitude of pad assemblies 1, each adapted to engage on the elongated product, For each track unit multiple squeeze actuators 36 are provided between the tensioner frame 32 and the chassis 34 of the track unit 33. An actuator control device is provided which is associated with the squeeze actuators 36 to control the squeeze force exerted by the pad assemblies on an elongated product supported in the product passage. It is observed that the tensioner has been depicted without such a product.

According to the invention, each of the pad assemblies 1 comprises:
- a carrier member 4, extending in a longitudinal direction, the carrier member having:
  - a base portion 6, which base portion extends in the longitudinal direction of the carrier member and is mounted on a track member of an endless track 35 of the tensioner 31;
  - an imaginary plane 8, which imaginary plane extends in the longitudinal direction of the carrier member 4 and divides the carrier member in a left half and a right half, and which imaginary plane comprises the passage axis 30 of the product passage 29 when the tensioner is in use;
  - two gripping member mating surfaces 9, which gripping member mating surfaces each extend in the longitudinal direction of the carrier member 4 and are located on opposite sides of, and are symmetrically placed relative to, the imaginary plane 8 of the carrier member; and
- a pair of gripping members 5, each gripping member having:
  - a foot 10, which foot is provided with a carrier member mating surface 12; and
  - a top 11, which top is adapted to frictionally clamp an outer circumference of the elongated product supported by the tensioner;
  - wherein the gripping members 5 are each with their carrier member mating surface 12 releasable mounted in a gripping position on one of the gripping member mating surfaces 9 of the carrier member 4, such that the gripping members are located on opposite sides of the imaginary plane 8 of the carrier member for engaging an outer circumference of the elongated product supported in the product passage 29;
  - wherein the mating surfaces 9 of the carrier member 4 and the mating surfaces 12 of the gripping members 5 form interlocking structures 13, which interlocking structures are adapted to transfer a squeeze force, for frictionally clamping the outer circumference of the elongated product with the gripping members, from the carrier member to the gripping members,
  - wherein the interlocking structures 13 of the gripping member mating surfaces 9 define multiple discrete gripping positions for releasable mounting the gripping members 5, in order to adapt the pad assembly 1 to a diameter of an elongate product to be supported and moved by the tensioner 31, and
  - wherein the gripping member mating surfaces 9 extend at an angle relative to each other, such that the multiple discrete gripping positions differ in their distance to the base portion 6 as well as in their distance to the imaginary plane 8 of the carrier member 4.

It is observed that the pad assemblies 1 provided on the tensioner tracks 35 can be adapted, by positioning the gripping members in different gripping positions, to match a product with a particular diameter. Thus, the pad assemblies provide the tensioner with an optimal grip for a range of products without the need of replacing the pad assemblies, more in particular the gripping members of the pad assemblies. In addition, different pairs of gripping member may be used to adapt the gripping assembly to an even wider range of product diameters The tensioner 31 has four track units 33 provided at even intervals around the product passage 29. Two of the track units 33 are depicted in FIG. 11. The tensioner pad assemblies 1 are mounted on the tensioner, more in particular on the endless tracks of the track units, such that the imaginary plane 8 of the pad assemblies comprises the central passage axis 28 of the product passage 29 of the tensioner when the tensioner is in use. Since the central axis of a product supported by the tensioner typically coincides with the central axis of the product passage, see for example FIGS. 3 and 6, the gripping members are thus optimally positioned to clampingly engage the product. The action line of the resulting clamping force transferred by the two gripping members lies in the imaginary plane and intersects the central axis of the product passage, and thus the central axis of the product supported in the product passage.

In the embodiment shown, each gripping member 5 is provided in the form of a single piece gripping body, comprising a grip surface for engaging a product at its top end 11 and the carrier member mating surface at its foot 10. In an alternative embodiment, the carrier member is composed out of different components which are bolted and/or welded together. For example, the gripping member may be provided with a single piece steel body that also forms the foot of the gripping member, and which steel body is provided with an interchangeably mounted top end, such that gripping member can be provided with a top end having a grip surface that provides the optimal grip on the outer surface of the product to be supported by the tensioner. For example, the gripper can thus be provided with a steel top end or a synthetic top end, or with a steel top end provided with a particular surface structure, such as protruding synthetic ribs or teeth, etc. In an alternative embodiment, the grip surface of the gripping body is an interchangeable part, such that the gripping member can be provided with different types of grip surface, to enable the grip surface of the gripping member to match with the surface properties of the tubular held in the product passage.

Figure 12:
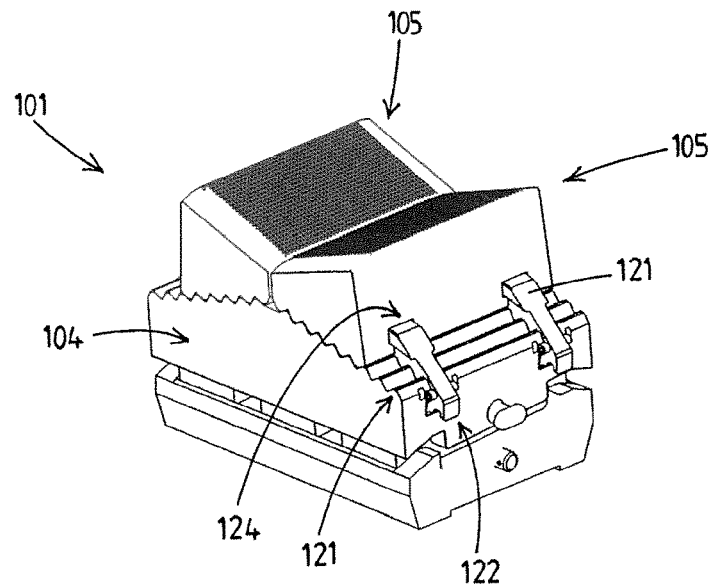
FIG. 12 shows a perspective view of a further alternative pad assembly according to the invention in a first working position.
Figure 13:
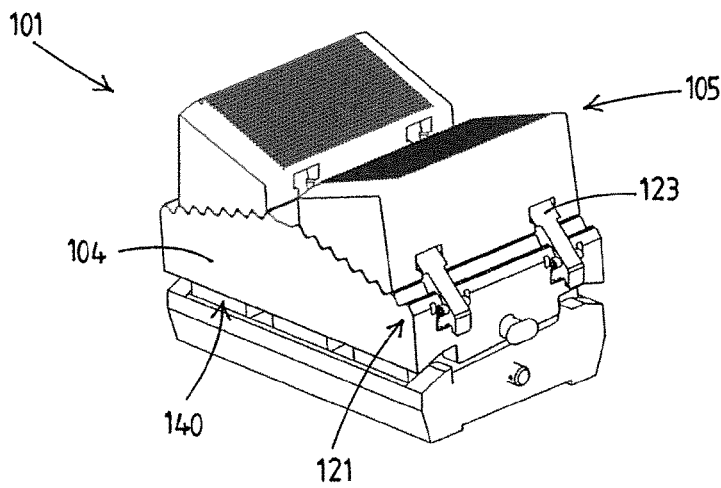
FIG. 13 shows a perspective view of the assembly of FIG. 12 in a second working position.
Figure 14:
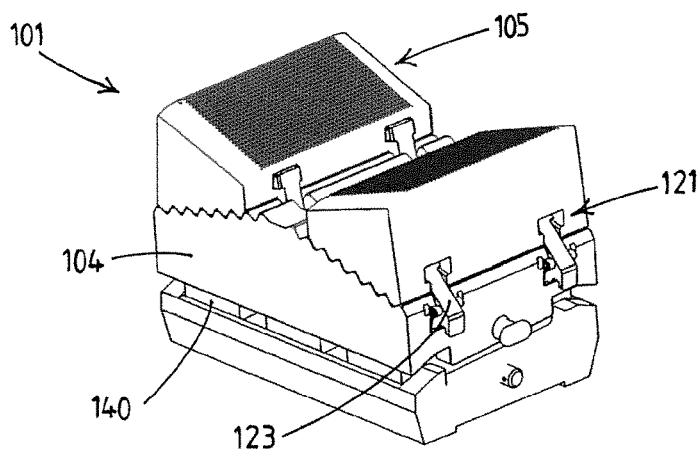
FIG. 14 shows a perspective view of the assembly of FIG. 12 in a preferred working position.

A further alternative tensioner pad assembly 101 according to the invention is shown in FIGS. 12-16. The pad assembly 101 comprises a carrier member 104, two gripping members 105, which are each provided with securing devices 121, releasable securing the gripping members to the carrier member. FIGS. 12-14 show the pad assembly with its gripping members secured in different working positions.

In the particular embodiment shown in FIGS. 12-16, the securing devices 121 each comprise a slot shaped fastener opening 122 in the carrier member and a slot shaped fastener opening 124 in the griping member, which fastener openings overlap each other when the gripping member is mounted on the carrier member in a working position. The securing devices 121 further each comprise a mounting pin 123, which mounting pin configured to slide into both the slot shaped fastener openings 122,124 at once, when the gripping member 105 is mounted on the carrier member 104 in a working position. The mounting pin has a cross section similar to an I-beam, i.e. with opposing flanges at each end, and the fastener openings have a corresponding cross section, to enable the mounting pin to slide into the fastener openings when the gripping member is mounted on the carrier member in a working position, and, once inserted in said openings, prevent the gripping member from being lifted from the carrier member.

It is noted that, in the particular embodiment shown, the interlocking structures 113 of the carrier member mating surface 112 and the gripping member mating surface 109 are provided in the form of parallel teeth extending at an angle, in the embodiment shown perpendicular, to the fastener openings 122,124 of the securing devices 121. Thus, the gripping members are fully fixed in their position once the pins have been inserted into the fastening openings.

The fastening devices depicted are efficient in that a single slot in the carrier member and a single slot in the gripping member allow for securing the gripping member in multiple positions. Furthermore, simply the sliding the mounting pin into the slots suffices for securing the gripping member in its working position, there is no need for bolting. In the embodiment shown, the mounting pin is simply secured by a locking pin.

Figure 15:
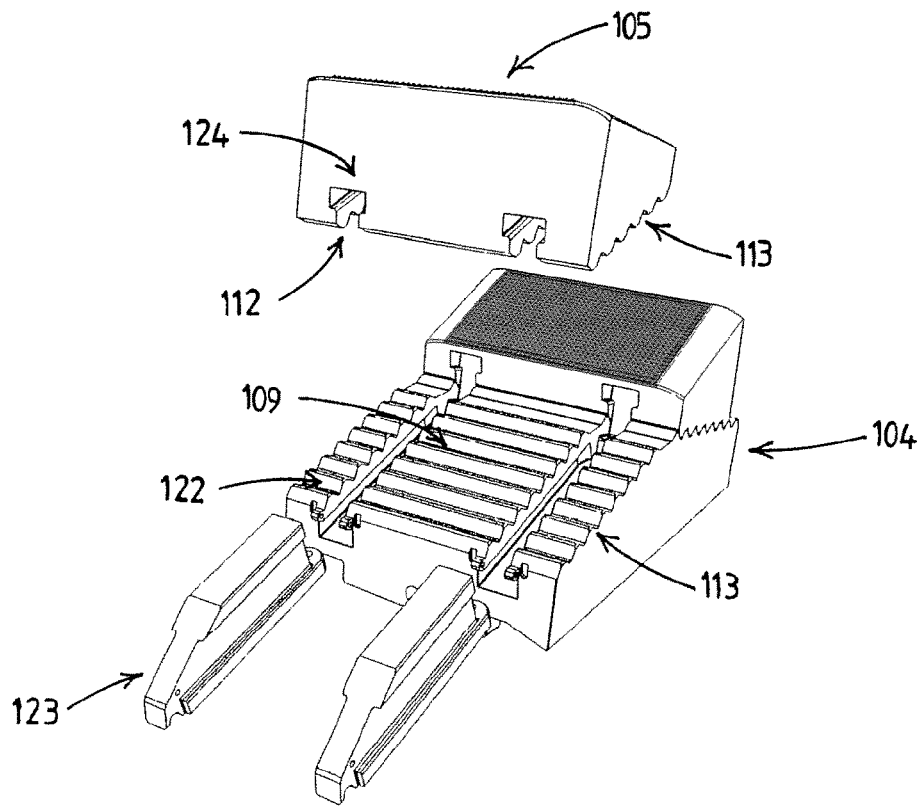
FIG. 15 shows a perspective view of the assembly of FIG. 12 with one that removed.
Figure 16:
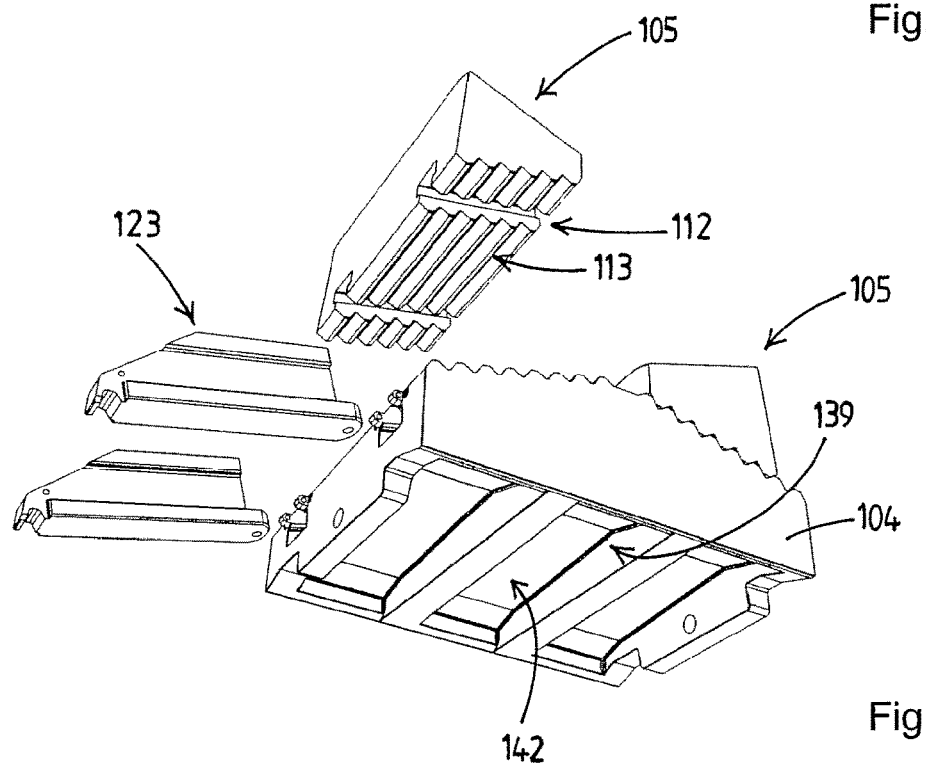
FIG. 16 shows a perspective bottom view of the assembly of FIG. 15 more.

FIG. 15 depicts the pad assembly 101 with the mounting pins 123 removed from the fastener openings 122,124, and one gripping member 105 lifted from the carrier member 104.

Furthermore, the base portion 106 of the carrier member 104 show in in FIGS. 12-16 is adapted to be mounted on an adapter plate 138 of a track member of an endless track of the tensioner. In the particular embodiment shown, the adapter plate 138 and the carrier member 104 are provided with recesses 139 for enclosing a resilient body 140 between the adapter plate and the carrier member. Furthermore, the carrier member 104 is at both ends pivotable secured to the adapter plate 138 with a mounting pin 41. Thus, resilient support of the carrier member 104 allows for some tilting of the carrier member when the gripping members first engage the endless object, and thus provide for smooth feeding of the elongated product between the carrier members of the opposed tracks.

It should be noted that the term "resilient" is a relative term, and that the resilient bodies mentioned above are resilient to an extend that they may resiliently transform during use, i.e. when under a load caused by the pad assembly engaging an elongated product supported by the tensioner.

Also, in the exemplary embodiment shown in FIGS. 12-16 the engagement surfaces 142 of the adapter plate 138 and carrier member 104, in the embodiment shown these are the bottom surfaces of the recesses 139 enclosing the resilient bodies 140, are slanted, i.e. extend at an angle, with respect to the transport direction of the elongated product through the tensioner, and thus to the longitudinal axis of the product passage, such that the engagement surfaces of opposed pad assemblies, i.e. pad assemblies located on opposite sides of the longitudinal product, define a V-shape. With such a configuration the pulling force enacted by the longitudinal product onto the pad assemblies creates a reaction force directed parallel to the longitudinal product and a reaction force perpendicular to the longitudinal products, the latter thus contributing to the clamping force of the tensioner.

It is noted that the features of the pad assembly depicted in FIGS. 12-16, e.g. the securing devices, the adapter plate, etc., can, in combination or in isolation, be combined with other pad assemblies according to the invention, for example with the pad assemblies depicted in FIGS. 3-8.

A further alternative tensioner pad assembly 201 according to the invention is shown in FIGS. 17-21. The pad assembly 201 comprises a carrier member 204, and multiple sets of gripping members.

FIGS. 17 and 18 show the pad assembly 201 with a first set of gripping members 205 in a first working position and in a second working position respectively.

FIGS. 19 and 20 show the pad assembly 201 with a second set of gripping members 206 in a first working position and in a second working position respectively.

FIG. 21 shows the pad assembly 201 with an alternative set of pads 207 in a first working position.

It should be noted that the FIGS. 17-21 does not show a cross section of a single tensioner, but depict different configurations of pad assemblies. Each figure depicts three pad assemblies, a first set comprising the left and the bottom pad assembly, and a second set, comprising the bottom and the right pad assembly. An actual tensioner would comprise four sets of pad assemblies, i.e. double the left set or double the right set, the two sets engaging a tubular product form four sides, similar to the pad assemblies depicted in FIGS. 3-8.

In each of the FIGS. 17-21 the position of the left and the right pad assembly relative to the bottom pad assembly differs. The left position corresponds with the tensioner engaging a tubular product of a first cross section, while the right position correspond with the tensioner engaging a tubular product having a second cross section, which second cross section is larger than the first cross section. Thus, it is shown that the pad assemblies with the gripping members in one working position can handle a range of cross sections.

The gripping members 205, 206, 207 of the pad assembly 201 shown in FIGS. 17-21 differ from the gripping members 5 of the pad assembly 1 shown in FIGS. 2-5 in that they are provided with an extra wide foot, providing the gripping members with an L-shaped configuration. The extra wide foot provides these gripping members with a relatively large carrier member mating surface, and thus an enhance capability of transferring transfer a squeeze force, for frictionally clamping the outer circumference of the elongated product with the gripping members, from the carrier member to the gripping members.

The invention claimed is:

1. A tensioner pad assembly, adapted to be mounted on an endless track of a tensioner to frictionally clamp an elongated product supported and moved by the tensioner, the pad assembly comprising:
   a carrier member, extending in a longitudinal direction, the carrier member having:
   a base portion, which base portion extends in the longitudinal direction of the carrier member and is adapted to be mounted on a track member of an endless track of the tensioner;
   an imaginary plane, which imaginary plane extends in the longitudinal direction of the carrier and divides the carrier member in a left half and a right half, and
   two outward facing gripping member mating surfaces, facing away from each other and away from the imaginary plane, which gripping member mating surfaces each extend in the longitudinal direction of the carrier member and are located on opposite sides of, and are symmetrically placed relative to, the imaginary plane of the carrier member; and
   a pair of gripping members, each gripping member having:
   a foot, which foot is provided with a carrier member mating surface; and
   a top, which top is adapted to frictionally clamp an outer circumference of the elongated product supported by the tensioner;

wherein the gripping members are each with their carrier member mating surface releasable mounted in a gripping position on one of the gripping member mating surfaces of the carrier member, such that the gripping members are located on opposite sides of the imaginary plane of the carrier member;

wherein the mating surfaces of the carrier member and the mating surfaces of the gripping members form interlocking structures, which interlocking structures are adapted to transfer a squeeze force, for frictionally clamping the outer circumference of the elongated product with the gripping members, from the carrier member to the gripping members, wherein the interlocking structures of the gripping member mating surfaces define multiple discrete gripping positions for releasable mounting the gripping members, in order to adapt the pad assembly to a diameter of an elongate product to be supported and moved by the tensioner, and wherein the gripping member mating surfaces extend at an angle relative to each other, such that the multiple discrete gripping positions differ in their distance to the base portion as well as in their distance to the imaginary plane of the carrier member.

2. The pad assembly according to claim 1, wherein each gripping member has an outside surface, which, when the respective gripping member is mounted in a gripping position, faces away from the carrier member, and an inside surface, which, when the respective gripping member is mounted in a gripping position, faces towards the carrier member, which inside and outside surface converge towards each other towards the top of the respective gripping member.

3. The pad assembly according to claim 1, wherein the top of each gripping member is provided with a grip surface to frictionally clamp an outer circumference of the elongated product supported by the tensioner, which grip surface is provided in the form of an interchangeable part, such that the respective gripping member is capable of being provided with different types of grip surface, to enable the grip surface of the respective gripping member to match with the surface properties of the tubular to be supported and moved by the tensioner.

4. The pad assembly according to claim 1, wherein the pad assembly further comprises one or more securing devices for releasable securing the gripping members to the carrier member in their gripping positions.

5. The pad assembly according to claim 4, wherein the securing device comprises multiple fastener openings disposed in each of the mating surfaces of the carrier member for receiving a mounting pin of the gripping member, to enable securing the gripping members to the carrier member in their gripping positions.

6. The pad assembly according to claim 1, wherein the pad assembly comprises multiple pairs of gripping members, each dedicated to a particular range of product diameters.

7. The pad assembly according to claim 1, wherein the interlocking structures comprise multiple parallel teeth and/or grooves.

8. The pad assembly according to claim 1, wherein the interlocking structures of mating surfaces of the carrier member in combination with the interlocking structures of the mating surfaces of the two gripping members define at least 6 discrete gripping positions for each gripping member.

9. The pad assembly according to claim 1, wherein the interlocking structures comprise converging interlocking members to facilitate mating the interlocking structures, and thus facilitate mounting a gripping member in a gripping position.

10. The pad assembly according to claim 1, further comprising a resilient body, which resilient body is part of the carrier member, to resiliently support the gripping members relative to the base portion.

11. The pad assembly according to claim 1, wherein the gripping members have a height, said height extending in a direction away from the base of the carrier member, such that when the gripping members are mounted in any of the gripping positions, the top end of the gripping member extends above the carrier member to such an extent that the contour of a product to be engaged by the gripping members does not contact the carrier member.

12. The pad assembly according to claim 1, wherein gripping member mating surfaces flank the carrier member, such that they face away from each other and provide the carrier member with a substantially trapezium shaped cross section.

13. The pad assembly according to claim 1, wherein the griping member mating surfaces of the carrier member face outward, such that
when the gripping members are mounted in their outer gripping position, they are located away from each other and away from the imaginary plane, and are located closely to the base portion of the carrier member, and
when the gripping members are mounted in their inner gripping position, they are located closely adjacent each other and close to the imaginary plane, and are located away from the base portion of the carrier member.

14. The pad assembly according to claim 1, wherein the gripping member mating surfaces of the carrier member enclose an angle in the range of 30 degrees up to 60 degrees.

15. A tensioner comprising the pad assemblies according to claim 1.

16. A vessel comprising the tensioner according to claim 15.

17. A method of using the tensioner according to claim 15 for handling an elongated product in the form of a tubular product the method comprising the steps of:
frictionally clamping an elongated product between the tensioner pad assemblies mounted on the endless tracks of the track units of the tensioner, to support and move the elongate product.

18. A method for adapting the pad assembly according to claim 1, to the circumference of an elongated product to be supports and moved by the tensioner, the method comprising the steps:
releasing any gripping member securing devices securing a first one of the two gripping members in a first gripping position;
lifting the first gripping member out of its gripping position;
lowering the first gripping member into a second gripping position;
securing any gripping member securing devices to secure the first gripping member in the second gripping position;
releasing any gripping member securing devices securing a second one of the two gripping members in a first gripping position;
lifting the second gripping member out of its gripping position;

lowering the second gripping member into a second gripping position; and securing any gripping member securing devices to secure the second gripping member in the second gripping position.

* * * * *